(12) United States Patent
Damien

(10) Patent No.: US 6,229,816 B1
(45) Date of Patent: *May 8, 2001

(54) COMBINING NETWORK AND MECHANISM FOR ALLOCATING RESOURCES OF SUCH A NETWORK

(75) Inventor: Souad Damien, Palaiseau (FR)

(73) Assignee: U.S. Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/715,692

(22) Filed: Sep. 18, 1996

(30) Foreign Application Priority Data

Sep. 20, 1995 (FR) .................................. 95 11036

(51) Int. Cl.$^7$ ........................................ H04J 3/16
(52) U.S. Cl. ...................... 370/443; 370/452; 370/460
(58) Field of Search ................. 370/434, 442, 370/443, 452, 458, 460

(56) References Cited

U.S. PATENT DOCUMENTS 4,718,061 * 1/1988 Turner .................................. 370/89
5,446,737 * 8/1995 Cidon et al. ....................... 370/85.5

OTHER PUBLICATIONS

A. Ruiz et al., "An Architecture and Implementation for an FDDI MAC Concentrator", SBT/IEEE International Telecommunications Symposium. ITS '90 (Cat. No. 90CH2901–7), pp. 255–259, Sep. 1990.*

Publication entitled "Reseaux Architectures, Protocoles, Applications" by Andrew Tanenbaum, published by InterEditions in 1990, p. 230–242.

* cited by examiner

Primary Examiner—Melvin Marcelo
(74) Attorney, Agent, or Firm—Gregory L. Thorne

(57) ABSTRACT

A network for interconnecting network equipment units via a ring optimizes access to the ring by the equipment units in that the capacity of the ring is permanently shared between the various equipment units. An information signal, representing the unused part of the capacity of the ring, is forwarded on the ring. The equipment units insert into a transport frame a number of data units corresponding to a minimum transmission right guaranteed to each equipment unit. The unused capacity of the ring is then subdivided between the equipment units.

19 Claims, 4 Drawing Sheets

COMBINING NETWORK AND MECHANISM FOR ALLOCATING RESOURCES OF SUCH A NETWORK

BACKGROUND OF THE INVENTION

1. Field of the Invention

The invention relates to a network comprising a plurality of network equipment units interconnected via a ring which conveys transport frames of data units at a rate that determines the capacity of the ring, the capacity being formed by a used part and an unused part.

The invention likewise relates to a network equipment unit intended to be interconnected with at least another network equipment unit via a packet switching ring which conveys transport frames whose rate determines the capacity of the ring, said capacity being formed by a used part and an unused part.

The invention finally relates to a method of controlling the access to an interconnection ring of a plurality of network equipment units, said ring forwarding transport frames of data units at a rate that determines the capacity of the ring, said capacity being formed by a used part and an unused part.

The invention has meaningful applications, more specifically in the field of local area networks, and more particularly in the field of combining rings using an ATM (Asynchronous Transfer Mode) protocol, for, for example, wideband ISDN networks.

2. Description of the Related Art

One of the problems posed in this type of networks is that of sharing the capacity of the ring between the various networks equipment units. The token ring technique, which is notably described in chapter 3.4.3 of the publication entitled "Reseaux, Architectures, Protocoles, Applications" by Andrew Tanenbaum, published by InterEditions in 1990, forms the conventional solution to this problem for rings of the Token Ring, FDDI . . . type. It consists of causing a particular bit sequence called a token to be forwarded permanently between the network equipment units when they have nothing to transmit. When an equipment unit wishes to transmit a frame, it is to take possession of the token and replace this token on the ring by the frame it wishes to transmit. A single equipment unit can thus transmit at a given instant, which induces all the others to postpone their request.

SUMMARY OF THE INVENTION

The invention notably has for its object to propose a method of controlling the access to an interconnection ring which does not have this drawback, as well as a network and a network equipment unit in which such a method is applied.

Therefore, a network according to the invention and as described in the opening paragraph is characterized in that the network comprises:

means for causing an information signal to be forwarded on the ring, which information signal represents the used part of the capacity of the ring and is updated by said equipment units, means for giving said equipment units a transmission right which notably depends on the unused part of the capacity of the ring.

In a preferred embodiment a network according to the invention comprises means for sharing the capacity of the ring between equipment units by:

assigning to each equipment unit a minimum transmission right, and dividing the unused part of the capacity of the ring depending on a dividing law between equipment units.

The invention thus makes it possible to optimize the access of the equipment units to the ring by permanently sharing the capacity of the ring between the various active equipment units in optimum fashion. Indeed, an information signal representing the used part of the capacity of the ring is permanently forwarded on the ring, so that an equipment unit may at any instant insert at least a number of data units corresponding to the minimum guaranteed transmission right into a transport frame, while the unused part of the capacity of the ring is furthermore divided between the active equipment units.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

In the following description, a network operating in an ATM (Asynchronous Transfer Mode) switching mode and which conveys frames of the SDH (Synchronous Digital Hierarchy) format is considered. The invention is, however, not restricted to this embodiment. The invention may also be applied to other transmission protocols for data units of constant size, or to protocols which permit to divide the data units. Likewise, other transport frame formats may be used, for example, the PDH (Plesiochronous Digital Hierarchy) format.

Figure 1:
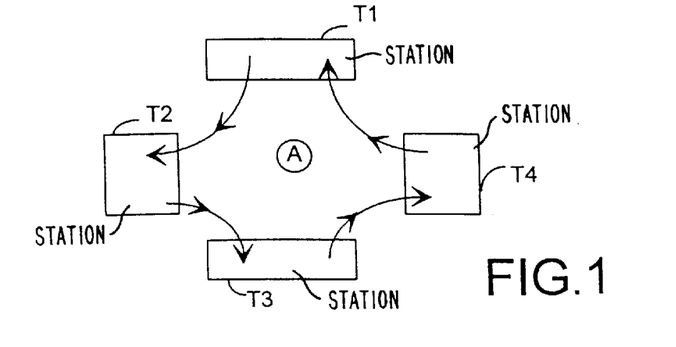
FIG. 1 represents a first embodiment of a network according to the invention.

FIG. 1 represents a network comprising four stations T1, T2, T3 and T4 interconnected by a ring A which is an ATM ring transporting SDH frames. Each station has a processing unit which permits to divide all the types of traffic into fixed-length data units called cells in the following of the description.

In conformity with the ATM standard, each cell comprises a header of 5 bytes which contains notably path and channel identifiers respectively called VPI (Virtual Path Identifier) and VCI (Virtual Channel Identifier), permitting of addressing the cell in the network, said header being followed by 48 payload bytes.

In the transmission mode, the stations thus divide the information to be transmitted into blocks of 48 bytes and add thereto the header of 5 bytes containing the identifiers (VPI, VCI) of the destination station of the cell. Then, the cell is stored in a memory called send memory. These cells are thereafter framed in SDH transport frames carried on ring A. These frames are to comprise a constant number of cells matching the rate; thus, they are complemented by empty cells, as required. These cells may be identified on the basis of their identifiers (VPI, VCI) and of their payload contents which have fixed values standardized by the CCITT.

In the receiving mode, the stations extract from the transport frame the cells that have these stations as their destination, store them in a memory called receive memory and reassemble messages which have the various applications as their destination.

The problem the invention intends to resolve is that of sharing the resources of the ring A between the various stations.

According to the invention, a minimum transmission right is guaranteed to each station and at any instant the unused part of the capacity of the ring is divided between the various stations depending on a dividing law. In the following of the description there will be considered that this dividing law is a proportional division of the minimum transmission right which is guaranteed to each station. The invention is not limited, however, to this embodiment and other types of division are suitable, for example, a division depending on a priority assigned to each station.

Thus, the minimum transmission right guaranteed to each station corresponds to the number of cells a station can transmit when the ring is loaded to its maximum. Conversely, each station may utilize up to the total capacity of the ring when none of the other stations is active.

The invention thus implies, on the one hand, to transmit on the ring and update in each station an information signal that represents the actually used part of the capacity of the ring and, on the other hand, to use this information signal for dividing the unused part of this capacity between stations.

This information called ring load factor in the following of the description, is conveyed in each SDH frame that is forwarded on the ring. When a station has in its send memory cells to be transmitted, it informs all the other stations of this by enhancing the load factor of the value of its minimum transmission right conveyed in the frame. Similarly, when a station no longer has data to be transmitted, it informs the other stations of this by diminishing the load factor of the value of its minimum transmission right contained in the frames forwarded on the ring.

Figure 2:
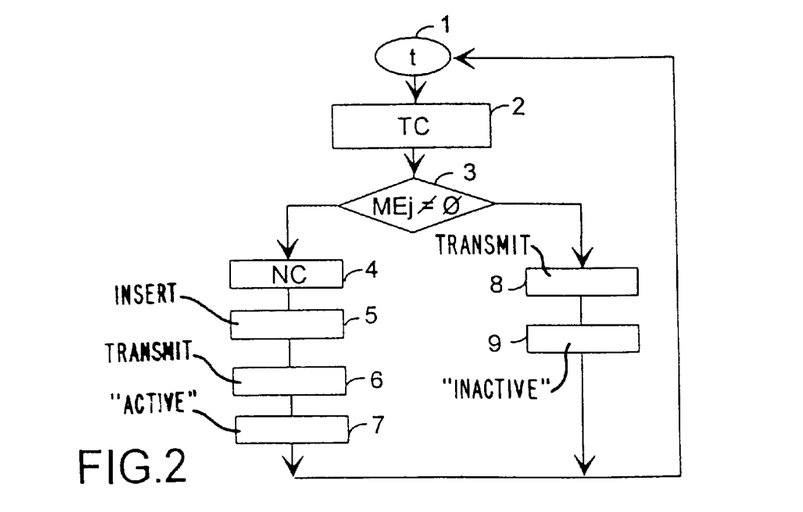
FIG. 2 represents an operation flow chart of an equipment unit of such a network.

FIG. 2 summarizes in the form of a flow chart the operation of a station j of a network according to the invention when it receives a transport frame.

In box 1, the station is in the standby mode for receiving a transport frame t. When the transport frame is received, the station updates the load factor contained in this frame (box 2). Then, if its send memory MEj contains cells to be transmitted (the test is made in box 3), it calculates (in box 4) the number of cells NC it is authorized to insert into the frame t before transmitting the frame back onto the ring. In box 5 the corresponding cells are inserted into the frame t which is transmitted in box 6. In box 7, the "active" state is assigned to a variable which represents the current state of the station. Then, the method is resumed at box 1. If, on the other hand, the test made in box 3 indicates that the send memory of the station does not contain any cell to be transmitted, the frame t is directly transmitted back onto the ring (box 8) and the variable of the state of the station adopts the value "inactive" (box 9). The method is then resumed at box 1.

An example of an updating method of the load factor will now be described in more detail for a first embodiment with the aid of the flow chart of FIG. 3.

In a general manner, the updates (increase or reduction of the load factor) are to be carried out once per frame that is forwarded on the ring. In this first embodiment, the load factor is transmitted in the header of the transport frame (the 2 bytes are used which have been reserved in the header of the SDH frame during the standardization for nonselected uses). It is thus necessary for each station to know the topology of the network to avoid modifying various times in succession the load factor conveyed via the same transport frame (there are as many frames forwarded on the ring as there are stations connected to the ring).

Figure 3:
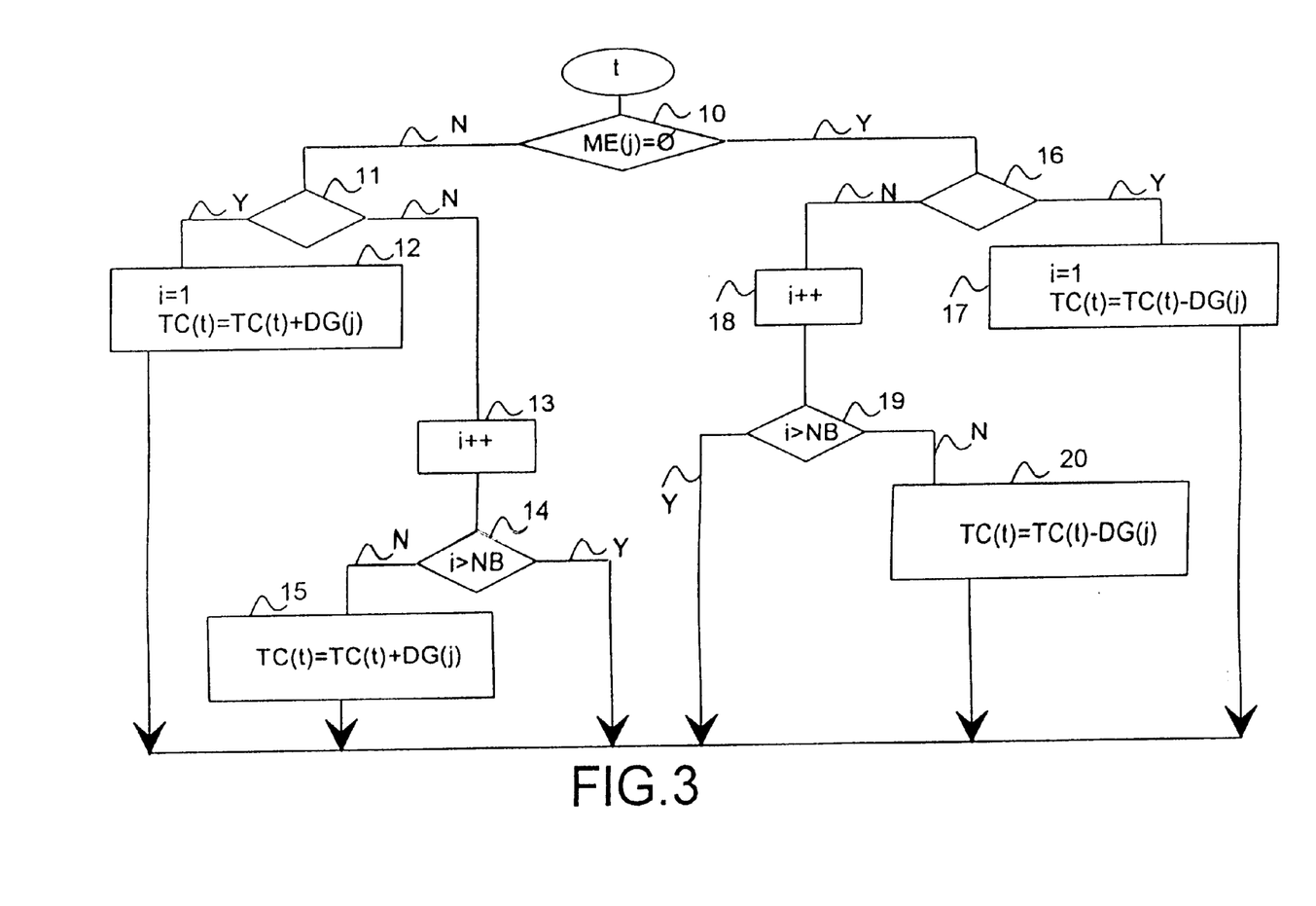
FIG. 3 is a flow chart of a method for updating information which relates to the use of the passband and is conveyed on the ring.

According to FIG. 3, the updating method of the load factor thus consists of verifying whether the send memory of the station j contains cells to be transmitted (box 10). In that case, it is necessary to distinguish whether the station j is in an inactive state (this test is carried out in box 11). If the station j is inactive, this means that the received frame t is the first one for which the station j has cells to be transmitted. A counter i is then initialized at the value 1, and the load factor TC(t) is increased by the value of the minimum transmission right DG(j) assigned to the station j (box 12). On the other hand, if the station j is active, the counter i is incremented by 1 (box 13), and the load factor is only updated (box 15) if i is lower than or equal to the number of stations NB connected to the ring (test carried out in box 14).

If the send memory of the station j does not contain any cells to be transmitted, and if the station is in an active state (test carried out in box 16), this means that it is the first frame for which the station j has no cells to be transmitted. The counter i is initialized at the value 1 and the load factor is reduced by the value of the minimum transmission right DG(j) of the station j (box 17). On the other hand, if the station is in an inactive state, the counter i is incremented (box 18) and the load factor is only updated (box 20) if the counter i is lower than or equal to the number of stations NB connected to the ring (test carried out in box 19).

In this embodiment, the load factor is reduced by the value of the minimum transmission right DG(j) of the station j once a frame has been received for which the send memory of the station is empty. However, it is possible to wait for the next frame in order to update the load factor only if the send memory is still empty, so as to avoid too frequent modifications of the value of the load factor due to temporary drops of traffic.

In a second embodiment, the load factor of the ring is conveyed in the first payload cell of the frame. Compared with the preceding embodiment, this embodiment offers the advantage of authorizing a much greater number of bytes for encoding the load factor information. These bytes may notably be utilized by each station for marking any update of the load factor. It is thus no longer necessary for each station to know the topology of the network to update the load factor information.

The load factor information thus updated is used for calculating the number of cells which the station can insert into this frame before transmitting the frame back onto the ring. This number of cells is calculated in optimum fashion to derive maximum profit from the capacity of the ring, without, however, blocking the other stations.

Therefore, the minimum transmission right DG(j) of each station j is expressed in the form of a number X of cells every N transport frames. N is preferably selected to be equal to a power of 2 to simplify the computations (because a division by a power of 2 simply corresponds to a shift to the left or to the right). N is, for example, advantageously selected to be equal to 8, to provide a range of rates which are guaranteed to be sufficiently large, running from one cell every 8 frames up to, for example, 40 cells per frame, that is to say, from 424 kb/s up to 135 Mb/s per step of 424 kb/s (each SDH frame comprising 44 ATM cells, the choice of a maximum of 40 cells per frame makes it possible to maintain a reliability margin of the order of 10%).

The maximum rate Dmax of the transport frame, as well as the load factor TC(t) conveyed in the frame t, are also expressed in a number of cells for N frames. Eventually, the following notations are used:

$$Dmax = Xmax/N$$

$$TC(t) = Xt/N$$

When a station has data to be transmitted, it computes its transmission right for the current frame, which transmission right is in the form of a first number Z1 of cells corresponding to the minimum transmission right guaranteed for that station, to which number of cells are added a second number Z2 of cells corresponding to the unused part of the capacity of the ring assigned to the station, and a third number of cells Z3 corresponding to a send credit of the station. This send credit is equal to the number of cells this station has been unable to send in previous frames either for lack of available space, or because it is possible to send in each frame only an integral number of cells (a transmission right of X/N cells for a frame corresponds to the effective transmission, (which depends on the available space), of E(X/N) cells where E represents the integer part function and the remaining part is accumulated in a variable called send credit, so that after N frames, X cells have actually been transmitted).

The ratio of the minimum transmission right guaranteed for the station j to the maximum rate of the transport frame is calculated once for each station. It is denoted Kj (Kj=Xj/Xmax). By taking into account that which precedes, the transmission right Erj of a station j for a frame t is thus expressed in the following manner:

$$ERj = Z1 + Z2 + Z3$$

$$ERj = Xj/N + [(Xmax - Xt)/N] \cdot [Xj/Xmax] + Z3$$

$$ERj = [2Xj - Kj \cdot Xt]/N + Z3$$

If N is a power of 2, the computation time of the transmission right corresponds to a shift and to a multiplication/addition for which are needed only several clock cycles, that is to say, a time period of the order of several dozen nanoseconds with current technology.

The available space in the transport frame permitting, each station thus transmits a number of cells equal to the integral part of its transmission right in conformity with a method to be described below, by way of example with reference to FIG. 4.

In box 33 the transmission right ERj of station j is calculated by taking into account the load factor which is extracted from the received frame t and previously updated in conformity with the method described with reference to FIG. 3. Then, in box 21, the number of empty locations F in the frame t is calculated. This is equal to the number of empty cells EC transported in the frame, to which are added the number of locations DC corresponding to the cells which have station j as their destination and which were previously extracted by the latter.

If the transmission right of the station is lower than or equal to the number of available locations (test carried out in box 22), the station is authorized to insert NC=E[Erj] cells into the frame (box 23). If the station still has data to be transmitted (test carried out in box 24), it updates in box 25 its send credit which thus adopts the following value:

$$Z3 = ERj - E[Erj]$$

If not, it resets its send credit to zero (box 26).

Figure 4:
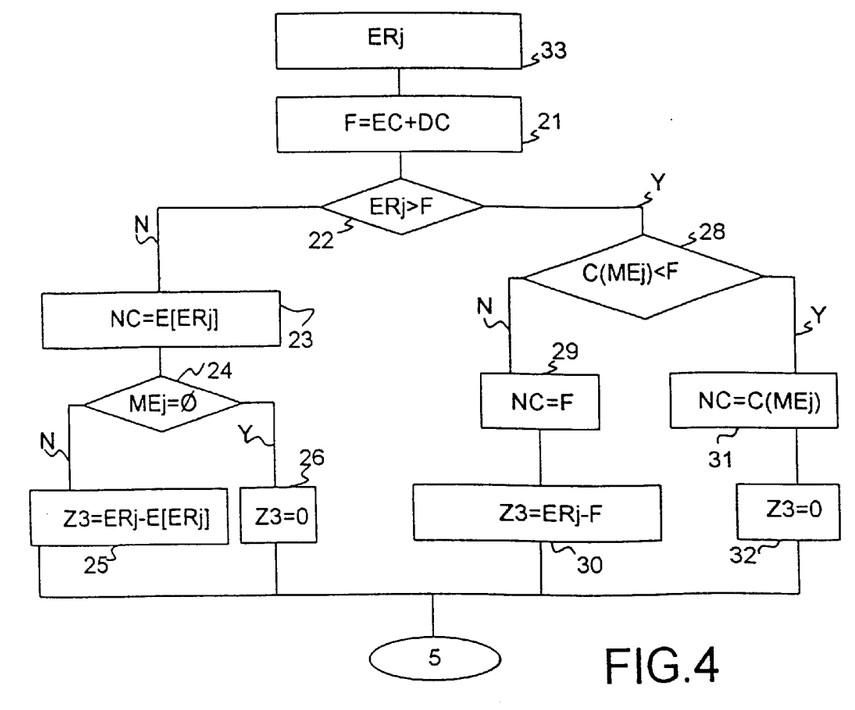
FIG. 4 is a flow chart of a method of computing the number of packets to be inserted into a transport frame by an equipment unit of the network.

On the other hand, if the transmission right of the station is higher than a number of empty locations, thus, if the station has enough cells to be transmitted (test carried out in box 28; the number of cells stored in the send memory MEj of the station j is denoted C(MEj) in the FIG. 4), it is authorized to send a number of cells NC equal to the number of empty locations F (box 29). Then, the station updates its send credit Z3 in box 30:

$$Z3 = ERj - F$$

If not, if the number of cells to be transmitted are lower than the number of empty locations, he station is authorized to transmit all its cells (box 31) after which it resets its send credit Z3 to zero (box 32).

At the end of boxes 25, 26, 30 and 32, the method is resumed with box 5 of the flow chart of FIG. 2.

Figure 5:
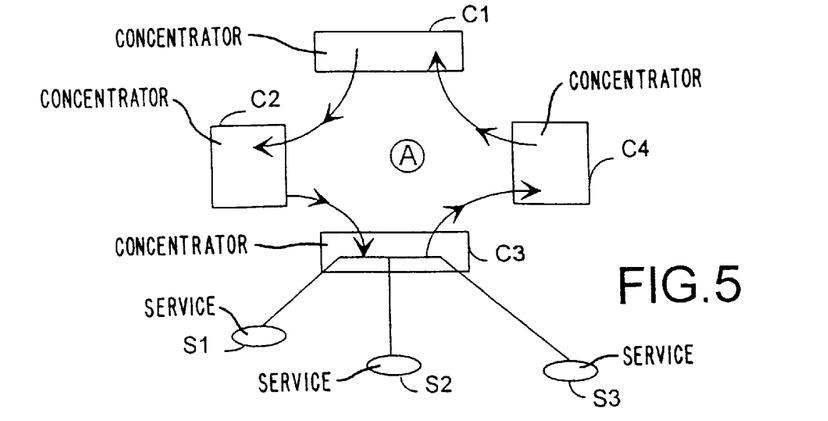
FIG. 5 represents a second embodiment of a network according to the invention.

A second embodiment of a network according to the invention is represented by way of example in FIG. 5. The network shown in FIG. 5 is a combining network connecting four service concentrators C1, C2, C3 and C4 via a ring A. Each concentrator forms an interface between the ATM ring and various subscribers (the concentrator C3, for example, forms an interface between the ring A and the services S1, S2 and S3) and no longer manages a single connection, but various pairs of identifiers (VPI, VCI). In a particularly simple embodiment, an identifier VPI is assigned to each concentrator, the services depending thereon being identified by an identifier VCI belonging to the concentrator.

When a transport frame arrives at a concentrator, a concentrator extracts therefrom all the cells that have its own subscribers as their destination by analyzing the VPI fields of the headers of the cells of the frame, and it inserts into the frame the cells from its send memory which have other concentrators of the network as their destination. This send memory of the concentrator groups the cells coming from the various services. The memory is organized in VCI links. The transmission right of each concentrator, calculated as indicated above, is thus to be divided between all the subscribers it manages.

In an advantageous embodiment, this division is proportional to the transmission bit rate of each service, and the cells which are not used by a service are again put at the disposal of the other services in proportion to their respective rates. Moreover, for a given transport frame, the assignment of a certain number of cells per service is made in a decreasing transmission bit rate order.

Therefore, for each link l are defined:

a link factor Q(l) which represents the proportion of the rate of link l relative to the minimum transmission right of the concentrator j:

$$Q(l) = D(l)/DG(j)$$

a transmission right CRED(l), a transmission right LER(l), which is equal to the sum of the transmission right of the link. CRED(l) and of the product of its link factor Q(l) via the number of cells NC which the concentrator is authorized to insert into the frame, a cell counter initialized at the arrival of each transport frame. This counter will be called send counter in the following of the description and is denoted CPT(l).

Figure 6:
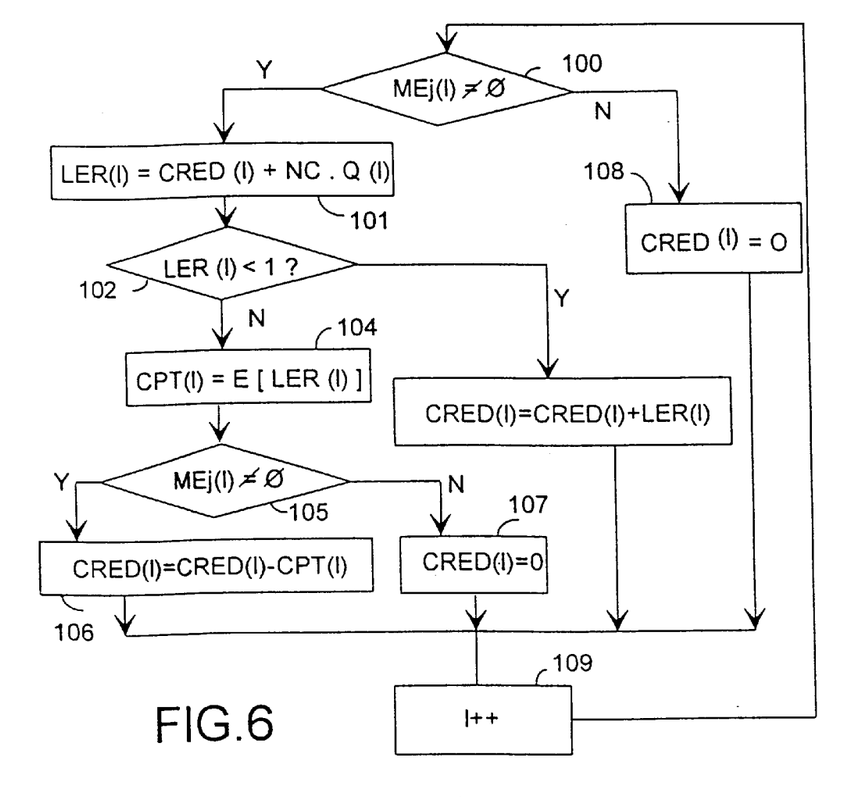
FIG. 6 is a flow chart of a method of dividing the transmission right between links managed by a single concentrator in the embodiment shown in FIG. 5.

An example of the dividing method for the number of cells NC to be inserted into a frame between the various links managed by the concentrator will now be described with reference to FIG. 6.

For each link in a decreasing transmission bit rate order, it is first verified whether the send memory of the concentrator contains data to be transmitted (box 100). In that case, its transmission right LER(l) is computed (box 101). If it is less than 1, (the test is carried out in box 102), the transmission right LER(l) is added to the send credit CRED(l) of the link (box 103). If not, the send counter of the link is updated in box 104; it is equal to the whole part of the transmission right of the link. Then, in box 105, it is verified whether the send memory of the concentrator still contains data to be transmitted in for link l. In that case, the send credit of the link is reduced by the value of the send counter of the link in box 106. If not, the send credit is set to zero in box 107. Finally, if the test carried out in box 100 indicates that the send memory does not contain any data to be transmitted for link l, the send credit is set to zero in box 108. At the end of the boxes 103, 106, 107 and 108, the method is resumed for the next link.

When this method has been repeated for each link that depends on the concentrator, there is verified whether the transmission right of the concentrator has been reached or whether there are still locations to be assigned. In the latter case, the method which has just been described is applied again in that, for the calculation of the transmission right LER(l) of each of the links, the total number of cells already transmitted for all the links is subtracted from the number of cells NC which the concentrator is authorized to insert into the frame.

In another embodiment, it is possible to take into account only the links that have data to be transmitted in order to accelerate the dividing process of the number of cells. Therefore, for example a cyclic task (activated every 4 or 8 transport frames, for example) is used which calculates the coefficients Q(l) of the links in the following manner:

$$Q(l)=D(l)/\Sigma D(l_m)$$

where the links $l_m$ are active links, that is to say, links that have data to be transmitted. If there are few active links, this method makes it possible to converge faster to values of the transmission right which are meaningful for the links.

In a still further embodiment, the division of the number of cells to be inserted into the frame between the various links is effected via priority rotation between the various active links. This embodiment is particularly adapted to concentrators which manage a small number of rings whose rates are identical.

In another, final embodiment, a static multiplexing table is established in advance as a function of the rate of each link managed by the concentrator. For a concentrator having a guaranteed rate of N cells per time unit, and managing n links L1 to Ln which themselves have rates of D1 to Dn cells per time unit, this embodiment comprises constructing a table of N locations by writing in a regular manner D1 times the link L1, . . . Dn times the link Ln in a decreasing transmission bit rate order. The table is finally compressed to suppress empty locations. Then, the concentrator fills the transport frame, depending on the level of its transmission right, with the cells of the active links by cyclically reading the multiplexing table thus formed. For example, while supposing that the concentrator can transmit 10 cells per time unit, and that it manages 5 links L1 to L5 which have the respective rates 3, 3, 2, 1 and 1 cells per time unit, the multiplexing table will contain 10 locations assigned in the respective order to the links L1, L2, L3, L1, L2, L3, L1, L2, L4 and L5. If one of the links has no data to be transmitted, it is skipped when the table is read out.

This embodiment is thus particularly indicated for concentrators which manage a small number of links which have different rates. Indeed, in the case where only the link L5 has data to be transmitted, one is nevertheless obliged to run through the complete table to verify whether the other links have no cells to be transmitted, for which is necessary a time period which is longer as the number of links is higher.

Figure 7:
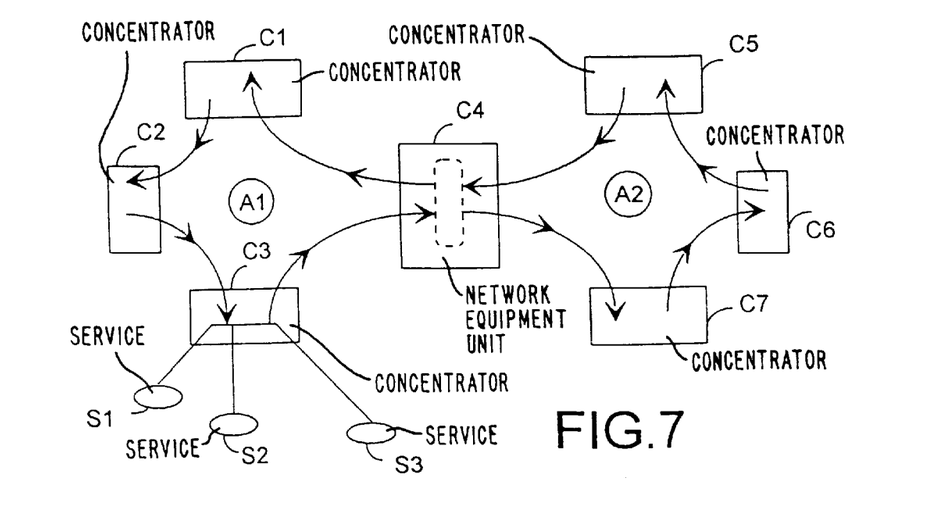
FIG. 7 represents a third embodiment of a network according to the invention, and FIG. 8 diagrammatically represents an equipment unit according to the invention intended to be used in a network as shown in FIG. 5.

A third embodiment of a network according to the invention is represented by way of example in FIG. 7. It relates to a network which interconnects two combining rings A1 and A2 such as described with respect to FIG. 5, via a network equipment unit C4 according to the invention. An identifier VPI is then assigned to each equipment unit, the subscribers of the various services being distinguished by their own identifier VCI. It is, for example, particularly advantageous to reserve in each identifier VCI one or various bits (depending on the number of network rings) to indicated which ring the matching subscriber belongs. The interconnection equipment unit thus has a routing table which makes it possible to cross-connect communications from one ring to another.

In this type of configuration, the interconnection equipment unit C4 extracts from the transport frames conveyed on ring A1 (A2, respectively) the cells which have as their destination services managed by the interconnection equipment unit and cells which have the ring A2 (A1, respectively) as their destination. The unit has two series of send and receive memories for storing cells which have the rings A1, A2 as their destination, or come therefrom, respectively. Two minimum transmission rights are guaranteed to the interconnection equipment unit for inserting cells into the frames conveyed via the rings A1 and A2, respectively.

This configuration is particularly effective when the services which have the most exchanges between them are grouped on the same combining ring.

Figure 8:
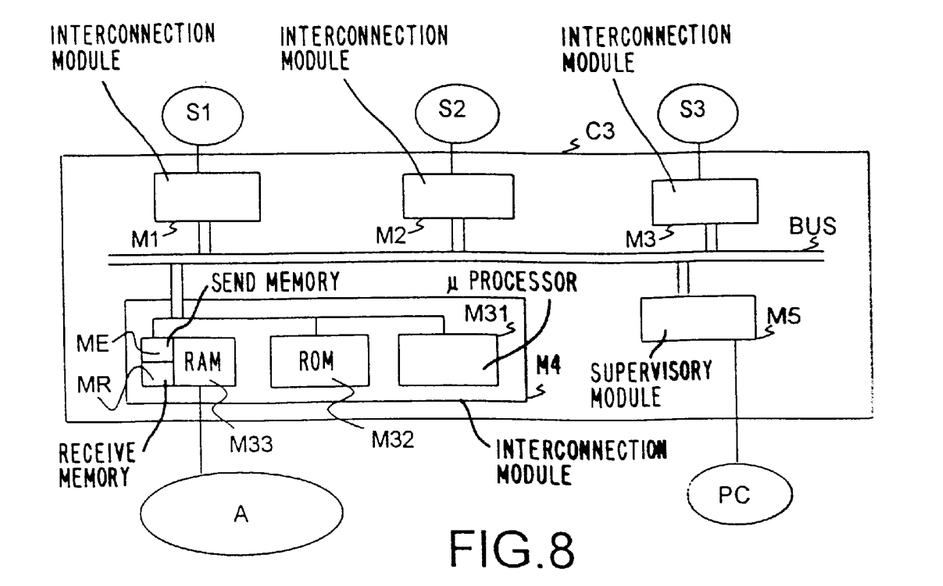

Finally, by way of example, FIG. 8 gives a representation of the concentrator C3 of FIG. 5. Such an equipment unit comprises, on the one hand, interconnection modules M1, M2 and M3 to the services S1, S2 and S3 and, on the other hand, an interconnection module M4 to the ATM ring. The concentrator also comprises a supervisory module M5 of the set of said modules. This module M5 is linked to an external PC for managing the concentrator. These modules are linked between them by at least a data bus BUS. These modules are constructed based on an M30 processor, for example, an M68040 by Motorola). Only the module M4 is shown in detail in the Figure: it comprises an actual microprocessor M31, a read-only memory M32 containing notably the instructions necessary for implementing the invention as regards the software, and a random access memory M33 containing notably the send memory ME and the receive memory MR of the concentrator.

It will be the obvious that the invention is not restricted to the embodiments that have just been described. The invention applies in a general manner to any system of interconnecting network equipment units via a ring.

What is claimed is:

1. A network comprising a plurality of network equipment units interconnected via a ring which conveys transport frames of data units at a rate that determines the capacity of the ring, said capacity being formed by a used part and an unused part, said network comprising:

means for causing an information signal to be forwarded on the ring, which information signal represents the used part of the capacity of the ring, and is updated by said equipment units; and means for distributing said capacity between equipment units by assigning a predetermined transmission right to each equipment unit, and adding to this predetermined transmission right an additional transmission right which corresponds to the redistribution of said unused part of the capacity of the ring between equipment units according to a redistribution law.

2. A network as claimed in claim 1, wherein the network comprises means for sharing the capacity of the ring between equipment units by dividing the unused part of the capacity of the ring depending on a dividing law between equipment units.

3. A network as claimed in claim 2, wherein said information is equal to the sum of the minimum transmission rights of the active equipment units, and in that said equipment units comprise means for updating said information in each of the frames forwarded on the ring when the units pass from an inactive state to an active state by adding thereto their minimum transmission right and, conversely, when the units pass from an active state to an inactive state by subtracting therefrom their minimum transmission right.

4. A network as claimed in claim 2 wherein said equipment units comprise:

means for receiving a transport frame;

means for extracting said information;

means for inserting into said frame a number of data units to be transmitted which are equal to the sum of a first number of data units corresponding to the minimum transmission right assigned to the equipment units, and a second number of data units which are additionally assigned to the equipment units via an application of said dividing law of the unused part of the capacity of the ring.

5. A network as claimed claim 2 wherein said dividing law is a proportional dividing law between the equipment units depending on their minimum transmission right.

6. A network as claimed in claim 1 wherein a network equipment unit is at least a service concentrator which comprises means for dividing the number of data units to be inserted into each transport frame between the various services in a proportional manner relative to their transmission bit rate, the data units not used by a service being put back at the disposal of the other services.

7. A method of controlling the access to an interconnection ring of a plurality of network equipment units, said ring forwarding transport frames of data units at a rate that determines the capacity of the ring, said capacity being formed by a used part and an unused part, the method comprising:

causing an information signal to be forwarded on the ring, which information signal represents the used part of the capacity of the ring and is updated by said equipment units, and giving to said equipment units a transmission right which notably depends on the unused part of the capacity of the ring, said transmission right for each equipment unit having a predetermined value that is unaffected by the activity of any of said equipment units.

8. A method as claimed in claim 7, characterized in that it notably comprises sharing the capacity of the ring between equipment units by:

dividing the unused part of the capacity of the ring depending on a dividing law between equipment units.

9. A network equipment unit intended to be interconnected to at least another network equipment unit via a ring which conveys transport frames of data units at a rate that determines the capacity of the ring, said capacity being formed by a used and an unused part, characterized in that the network equipment unit comprises:

means for updating information which is representative of said used part of the capacity of the ring, which information is conveyed in frames forwarded on the ring, means for determining the number of data units the network equipment unit is authorized to transmit, this number notably depending on the unused part of the capacity of the ring, said number of data units having a predetermined value which is unaffected by the number of data units authorized to any of said equipment units.

10. A network equipment unit as claimed in claim 9, characterized in that it comprises means for forming data units it is authorized to transmit based on a second number of data units assigned to the equipment unit via an application of a dividing law which divides between equipment units the unused part of the capacity of the ring.

11. A network as claimed in claim 3, wherein said equipment units comprise:

means for receiving a transport frame;

means for extracting said information; and means for inserting into said frame a number of data units to be transmitted which are equal to the sum of a first number of data units corresponding to the minimum transmission right assigned to the equipment units, and a second number of data units which are additionally assigned to the equipment units via an application of said dividing law of the unused part of the capacity of the ring.

12. A network as claimed in claim 3, wherein said dividing law is a proportional dividing law between the equipment units depending on their minimum transmission right.

13. A network as claimed in claim 4, wherein said dividing law is a proportional dividing law between the equipment units depending on their minimum transmission right.

14. A network as claimed in claim 2, wherein a network equipment unit is at least a service concentrator which comprises means for dividing the number of data units to be inserted into each transport frame between the various services in a proportional manner relative to their transmission bit rate, the data units not used by a service being put back at the disposal of the other services.

15. A network as claimed in claim 3, wherein a network equipment unit is at least a service concentrator which comprises means for dividing the number of data units to be inserted into each transport frame between the various services in a proportional manner relative to their transmission bit rate, the data units not used by a service being put back at the disposal of the other services.

16. A network as claimed in claim 4, wherein a network equipment unit is at least a service concentrator which comprises means for dividing the number of data units to be inserted into each transport frame between the various services in a proportional manner relative to their transmission bit rate, the data units not used by a service being put back at the disposal of the other services.

17. A network as claimed in claim 5, wherein a network equipment unit is at least a service concentrator which comprises means for dividing the number of data units to be inserted into each transport frame between the various services in a proportional manner relative to their transmission bit rate, the data units not used by a service being put back at the disposal of the other services.

18. A network for transmitting frames of data among a plurality of nodes connected by a ring at a rate that defines a capacity of said ring, said network comprising:
 a load factor having a magnitude representing the total amount of data to be sent by said nodes, said magnitude being altered by a level of activity of said nodes;
 said load factor being sent to each of said nodes in said frames along with transmitted data;
 each of said nodes being assigned a transmission right being determined by said load factor and a dividing law, said transmission right of said node having a predetermined value that is unaffected by said transmission rights of any of said nodes; and
 said transmission right further being determined by a transmission credit, said transmission credit depending on previous transmission rights that were not fully utilized.

19. A network having a plurality of equipment units coupled together by a ring which conveys transport frames of data units, a representative equipment unit comprising;
 means for calculating a transmission right based upon a predetermined transmission right, an unused capacity right, and a transmission credit;
 said predetermined transmission right being allocated to each equipment unit and being unaffected by activity of any of said equipment units;
 said unused capacity right being calculated by determining which of said equipment units are active and dividing available portions of said frames amongst the active equipment units according to a dividing law;
 said transmission credit depending on previous transmission rights that were not fully utilized by said representative equipment unit;
 means for calculating an available number of free locations in said frames, said available number based upon an unused portion of said frames and on portions whose destination was said representative equipment unit; and
 means for inserting data from said representative equipment unit into said frame based upon said available number of free locations and said transmission right.

\* \* \* \* \*